(12) United States Patent
Takagi et al.

(10) Patent No.: US 11,180,006 B2
(45) Date of Patent: Nov. 23, 2021

(54) VEHICLE DOOR APPARATUS

(71) Applicant: HONDA MOTOR CO., LTD., Tokyo (JP)

(72) Inventors: Yozo Takagi, Wako (JP); Takehiro Ishibashi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 131 days.

(21) Appl. No.: 16/832,545

(22) Filed: Mar. 27, 2020

(65) Prior Publication Data

US 2021/0300162 A1  Sep. 30, 2021

(51) Int. Cl.
| B60J 5/06 | (2006.01) |
| B60J 5/04 | (2006.01) |
| B60R 16/00 | (2006.01) |
| E05F 15/00 | (2015.01) |
| B60N 2/01 | (2006.01) |

(52) U.S. Cl.
CPC .............. *B60J 5/06* (2013.01); *B60J 5/0479* (2013.01); *B60N 2/01* (2013.01); *B60R 16/005* (2013.01); *E05F 15/00* (2013.01); *E05Y 2900/531* (2013.01)

(58) Field of Classification Search
CPC ... B60J 5/06; B60J 5/0479; B60N 2/01; E05F 15/00; B60R 16/005; E05Y 2900/531
USPC ........................................................ 295/155
See application file for complete search history.

(56) References Cited

U.S. PATENT DOCUMENTS

| 3,745,705 | A | * | 7/1973 | Reddy | E05F 15/657 49/139 |
| 6,234,565 | B1 | * | 5/2001 | Bryant | B60J 5/06 296/155 |
| 7,421,321 | B2 | * | 9/2008 | Breed | B60C 11/24 340/442 |
| 7,438,346 | B1 | * | 10/2008 | Breed | E05C 17/203 296/146.12 |
| 7,918,100 | B2 | * | 4/2011 | Breed | F24F 11/30 62/244 |
| 9,605,470 | B2 | * | 3/2017 | Matsumoto | E05F 15/73 |
| 2015/0267453 | A1 | * | 9/2015 | Matsumoto | H01H 3/142 49/27 |
| 2018/0163437 | A1 | * | 6/2018 | Ishikawa | E05B 83/40 |
| 2018/0266159 | A1 | * | 9/2018 | Bito | E05F 15/40 |
| 2019/0149151 | A1 | * | 5/2019 | Okada | H03K 17/965 200/211 |
| 2021/0295697 | A1 | * | 9/2021 | Vallance | G06K 9/00785 |

FOREIGN PATENT DOCUMENTS

| JP | 2003-278447 A | 10/2003 |
| JP | 2019-142285 A | 8/2019 |

* cited by examiner

*Primary Examiner* — Pinel E Romain
(74) *Attorney, Agent, or Firm* — Westerman, Hattori, Daniels & Adrian, LLP

(57) ABSTRACT

A vehicle door apparatus includes: a first slide door and a second slide door that are slidably provided between a close position at which an opening part of a vehicle is closed and an open position at which the opening part is opened and that have door frame parts butted to each other in a state where the opening part is closed; and a door opening/closing switch that is provided on an inner side wall positioned on a side to which each slide door is opened among the door frame parts of the first slide door and the second slide door and that opens and closes each of the slide doors.

7 Claims, 3 Drawing Sheets

VEHICLE DOOR APPARATUS

BACKGROUND

Field of the Invention

The present invention relates to a vehicle door apparatus.

Background

Among door apparatuses of vehicles, such an apparatus is known in which double doors which are a front door (first door) and a rear door (second door) are supported at an opening part of a vehicle, and a door opening/closing switch that automatically opens and closes the double doors is provided on a driver's seat of the vehicle and on an outer side part of the vehicle. According to such a door apparatus, by operating the door opening/closing switch from the driver's seat of the vehicle or the outside of the vehicle, it is possible to automatically open and close the double doors (for example, refer to Japanese Unexamined Patent Application, First Publication No. 2003-278447).

In view of the operability of the door opening/closing switch, it is conceivable that, for example, the door opening/closing switch is provided on the first door or the second door. Thereby, it becomes possible for an occupant seated on a seat on each door side to operate the door opening/closing switch and to open and close the door.

However, in a case where the door opening/closing switch is provided on the first door or the second door, the body of the occupant seated on the seat may inadvertently touch the door opening/closing switch and cause the switch to erroneously operate.

As apparatuses that prevent an erroneous operation of the switch provided on the door, for example, such an apparatus is known that expands an air bag to the vicinity of the switch. According to such an apparatus, for example, by expanding the air hag to the vicinity of the switch at a time of collision, the expanded air bag allows the body of the occupant not to touch the switch, and it is possible to prevent the erroneous operation of the switch (for example, refer to Japanese Unexamined Patent Application, First Publication No. 2019-142285).

SUMMARY

However, the apparatus that prevents an erroneous operation described in Japanese Unexamined Patent Application, First Publication No. 2019-142285 requires a configuration for expanding an air bag. Therefore, the configuration of the erroneous operation prevention apparatus becomes complicated, which prevents the costs from being reduced.

The present invention is intended to provide a vehicle door apparatus capable of allowing an occupant seated on a seat to easily operate a switch and preventing an erroneous operation of the switch by a simple configuration.

A first aspect of the present invention provides a vehicle door apparatus including: a first slide door and a second slide door that are slidably provided between a close position at which an opening part of a vehicle is closed and an open position at which the opening part is opened and that have door frame parts butted to each other in a state where the opening part is closed; and a door opening/closing switch that is provided on an inner side wall positioned on a side to which each slide door is opened among the door frame parts of the first slide door and the second slide door and that opens and closes each of the slide doors.

According to this configuration, the door opening/closing switch is provided on the inner side wall among the door frame parts of the first slide door and the second slide door. Here, for example, in a case where a first seat and a second seat are provided to face each other at a position on the first slide door side and at a position on the second slide door side, respectively, the inner side wall of the door frame part is arranged facing each seat. Accordingly, by providing the door opening/closing switch on each inner side wall, each door opening/closing switch can be arranged facing the first seat and the second seat. Thereby, it becomes possible for occupants seated on the first seat and the second seat to easily operate the door opening/closing switch.

Further, by providing the door opening/closing switch on the inner side wall of the door frame part, it is possible to prevent the door opening/closing switch from protruding to the vehicle room side from a top wall along a door opening/closing direction of the door frame part. The top wall is a wall part that protrudes most to the vehicle room side of the door frame part. Accordingly, by allowing the door opening/closing switch not to protrude from the top wall to the vehicle room side, it is possible to allow the body or hand of the occupant seated on the seat not to easily touch the door frame part inadvertently. Thereby, it is possible to prevent an erroneous operation of the door opening/closing switch by a simple configuration in which the door opening/closing switch is provided on the inner side wall of the door frame part.

As a second aspect of the present invention, the vehicle door apparatus may include a first seat and a second seat provided to face each other at a position on the first slide door side and at a position on the second slide door side, respectively, wherein the door opening/closing switch may be provided at a position facing an occupant seated on each of the first seat and the second seat and operable from the occupant.

According to this configuration, the first seat and the second seat are provided to face each other at the position on the first slide door side and at the position on the second slide door side, and thereby, each seat can be arranged to face the inner side wall of the door frame part. Accordingly, it is possible to allow the door opening/closing switches on the inner side wall to face adults (occupants) seated on the first seat and the second seat. Further, by providing the door opening/closing switch at a position operable from an adult (occupant), it is possible to allow the occupant seated on the first seat or the second seat to easily operate the door opening/closing switch.

As a third aspect of the present invention, the door opening/closing switch may be provided at a position that corresponds to a head part of the occupant.

According to this configuration, by providing the door opening/closing switch at a position corresponding to the head part of the occupant, the door opening/closing switch can be arranged at a high position to some extent. Thereby, it is possible to allow the body or hand of the occupant not to easily touch the door opening/closing switch inadvertently, and it is possible to further favorably prevent an erroneous operation of the door opening/closing switch.

Further, by arranging the door opening/closing switch at a high position to some extent, for example, it is possible to prevent an inadvertent operation by a child or the like.

As a fourth aspect of the present invention, the vehicle door apparatus may include a travel start switch that is provided on the first slide door and the second slide door and that operates a travel of the vehicle, wherein the travel start switch may be arranged at a hidden position in a state where each of the slide doors is opened to the open position.

According to this configuration, in a state where the first slide door and the second slide door are opened to the open position, the travel start switch is arranged at a hidden position. Thereby, in a state where the first slide door and the second slide door are open, for example, it is possible to allow the body or hand of the occupant not to touch the travel start switch, and it is possible to prevent an erroneous operation of the travel start switch.

As a fifth aspect of the present invention, the door opening/closing switch may be arranged at an exposed position in a state where each of the slide doors is opened to the open position.

According to this configuration, in a state where the first slide door and the second slide door are opened to the open position, the door opening/closing switch is arranged at an exposed position (non-hidden position). Thereby, in a state where the first slide door and the second slide door are opened to the open position, the door opening/closing switch is operable, and it is possible to close each slide door.

As a sixth aspect of the present invention, the vehicle door apparatus may include a travel start switch that is provided on the first slide door and the second slide door and that operates a travel of the vehicle, wherein the travel start switch may be arranged at a position where the travel start switch is hidden prior to the door opening/closing switch when each of the slide doors is slid and moved in a direction in which the opening part is opened.

According to this configuration, the travel start switch is arranged at a position hidden prior to the door opening/closing switch when the first slide door and the second slide door are slid and moved in a direction in which the opening part is opened. Accordingly, it is possible to hide the travel start switch when each slide door is open. Thereby, when each slide door is open, it is possible to prevent the travel start switch from being operated, and it is possible to prevent the vehicle from traveling.

As a seventh aspect of the present invention, the vehicle door apparatus may include: a first seat and a second seat provided to face each other at a position on the first slide door side and at a position on the second slide door side, respectively; and a travel start switch that is provided on each of the first slide door and the second slide door and that operates a travel of the vehicle, wherein the door opening/closing switch may be provided at a position that is more distant from a seating position of each of the seats than the travel start switch.

According to this configuration, the door opening/closing switch is arranged at a position that is more distant from the seating position of each seat than the travel start switch. Thereby, it is possible to allow the body or hand of the occupant seated on each seat not to easily touch the door opening/closing switch inadvertently, and it is possible to further favorably prevent an erroneous operation of the door opening/closing switch.

Further, by arranging the door opening/closing switch at a position that is more distant from the seating position of each seat than the travel start switch, it is possible to arrange the travel start switch at a position closer to a side to which each slide door is opened compared to the door opening/closing switch. Accordingly, it is possible to hide the travel start switch when each slide door is open. Thereby, when each slide door is open, it is possible to prevent the travel start switch from being operated and prevent the vehicle from traveling.

According to the aspect of the present invention, it is possible to allow the occupant seated on the seat to easily operate the switch, and it is possible to prevent an erroneous operation of the switch by a simple configuration.

DESCRIPTION OF THE EMBODIMENTS

Figure 1:
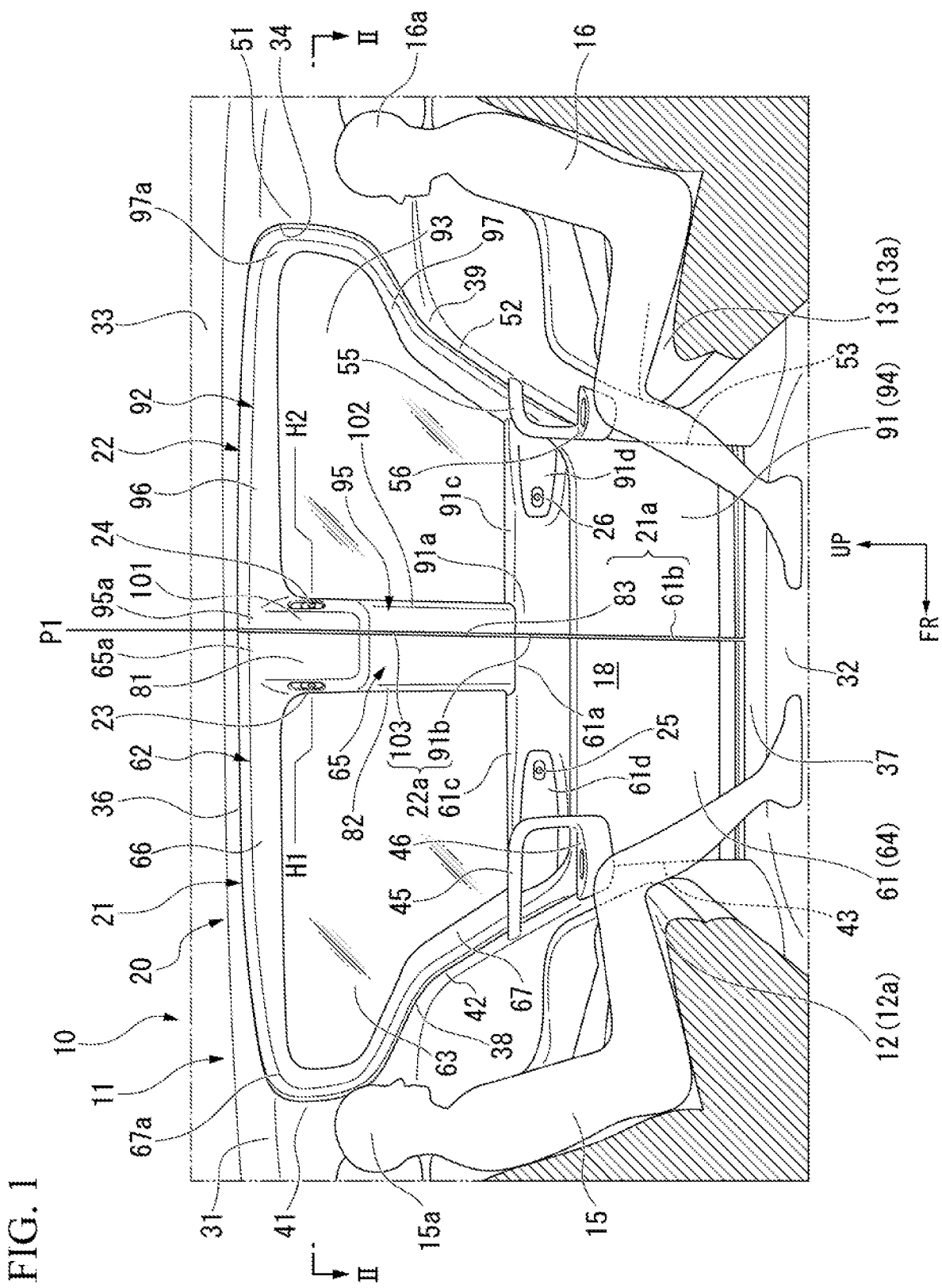
FIG. 1 is a side view showing a state in which an opening part of a vehicle door apparatus is closed when seen from a vehicle room side in an embodiment according to the present invention.

Hereinafter, a vehicle door apparatus according to an embodiment of the present invention will be described with reference to the drawings. In the drawings, an arrow FR indicates a frontward direction of a vehicle, an arrow UP indicates an upward direction of the vehicle, and an arrow LH indicates a leftward direction of the vehicle.

As shown in FIG. 1, a vehicle 10 is, for example, a so-called automated driving vehicle capable of automatically traveling in a state where a human does not perform a driving operation. The vehicle 10 includes a vehicle body 11, a front seat (first seat) 12, a rear seat (second seat) 13, and a vehicle door apparatus 20.

The embodiment is described using an example in which the vehicle 10 is an automated driving vehicle; however, the vehicle 10 may be another type of vehicle.

The vehicle door apparatus 20 includes a front slide door (first slide door) 21, a rear slide door (second slide door) 22, a front door opening/closing switch (door opening/closing switch) 23, a rear door opening/closing switch (door opening/closing switch) 24, a front travel start switch (travel start switch) 25, and a rear travel start switch (travel start switch) 26.

<Vehicle Body>

The vehicle body 11 includes, for example, a vehicle body side part 31, a floor part 32, a roof part 33, and an opening part 34. The vehicle body side part 31 is provided, for example, on a right side of the vehicle body 11 between the floor part 32 and the roof part 33. The vehicle body side part 31 includes, for example, the opening part 34 through which an occupant rides and exits. The opening part 34 is an opening part of the vehicle 10 that opens between the floor part 32 and the roof part 33. Specifically, the opening part 34 includes an upper side portion 36, a lower side portion 37, a front side portion 38, and a rear side portion 39.

The upper side portion 36 extends in a vehicle body front-to-rear direction along a right side portion of the roof part 33. The lower side portion 37 extends in the vehicle body front-to-rear direction along a right side portion of the floor part 32.

The front side portion 38 has, for example, a first front side 41, a second front side 42, and a third front side 43. The first front side 41 extends downward from an upper end close to the roof part 33. The second front side 42 extends to be inclined in an inverse V shape in a vehicle rearward and downward direction from a lower end of the first front side 41. The third front side 43 extends downward from the lower end of the second front side 42 to the floor part 32 side. A front handle 45 and a front tray 46 are provided on a lower portion of the second front side 42.

The rear side portion 39 is formed, for example, substantially symmetrically to the front side portion 38 in a vehicle body front-to-rear direction. That is, the rear side portion 39 has a first rear side 51, a second rear side 52, and a third rear side 53 similarly to the front side portion 38. A rear handle 55 and a rear tray 56 are provided on a lower portion of the second rear side 52.

<Front Seat>

Figure 2:
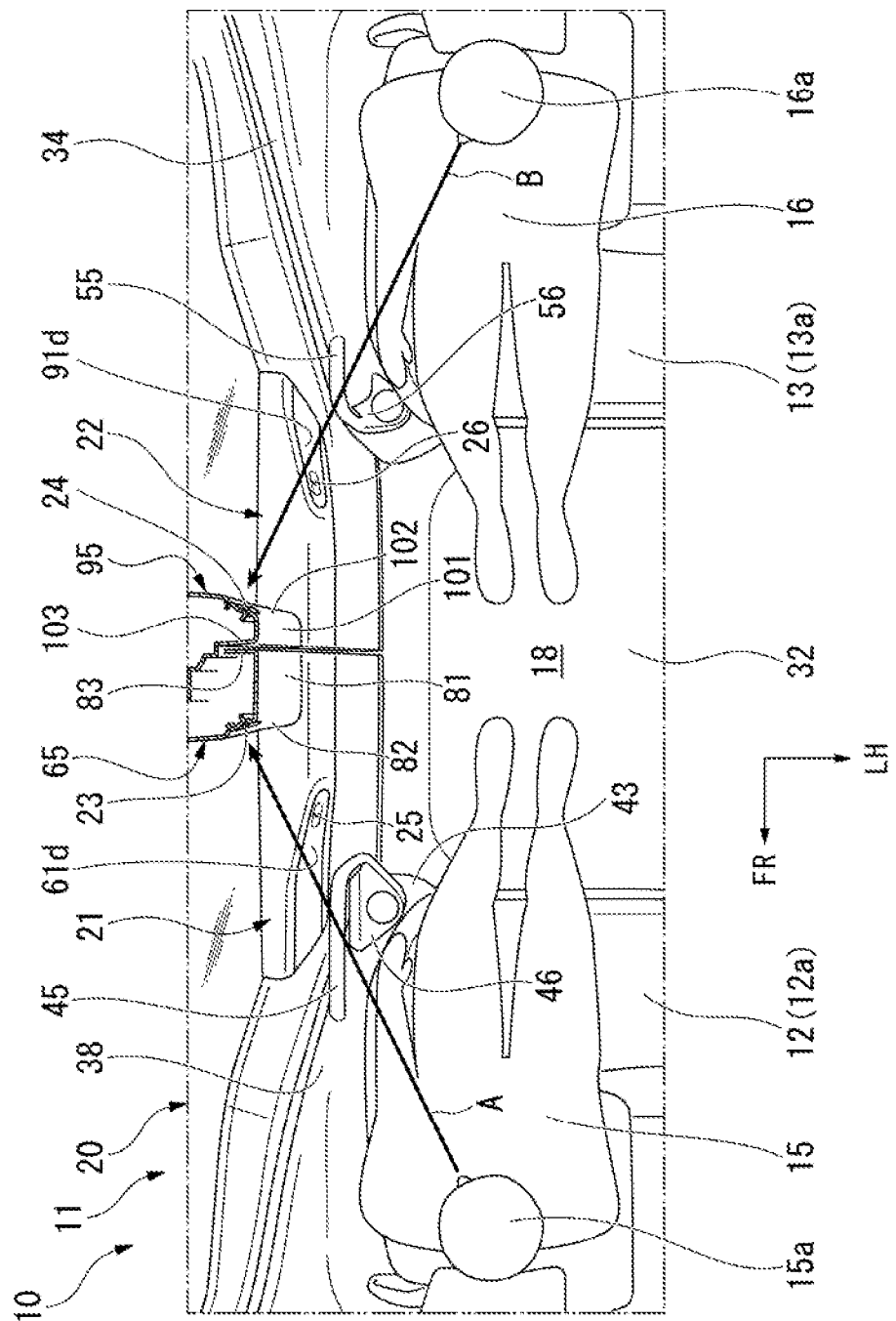
FIG. 2 is a cross-sectional view of the vehicle door apparatus of FIG. 1 sectioned at a II-II line.

As shown in FIG. 1 and FIG. 2, the front seat 12 is arranged along the vehicle body side part 31 and at a further vehicle body frontward position than the third front side 43 of the front side portion 38 of the opening part 34. That is, the front seat 12 is arranged on a side of the front slide door 21 (described below) in a vehicle width direction. In this state, the front seat 12 is provided on the floor part 32 such that a seat part 12a on which an occupant 15 is seated faces a vehicle body rearward direction. Accordingly, the occupant 15 is seated on the front seat 12 facing the rearward direction with respect to a proceeding direction of the vehicle 10.

<Rear Seat>

The rear seat 13 is arranged, for example, substantially symmetrically to the front seat 12 in the vehicle body front-to-rear direction. Specifically, the rear seat 13 is arranged along the vehicle body side part 31 and at a further vehicle body rearward position than the third rear side 53 of the rear side portion 39 of the opening part 34. That is, the rear seat 13 is arranged on a side of the rear slide door 22 (described below) in the vehicle width direction. In this state, the rear seat 13 is provided on the floor part 32 such that a seat part 13a on which an occupant 16 is seated faces a vehicle body frontward direction. Accordingly, the occupant 16 is seated on the rear seat 13 facing the frontward direction with respect to the proceeding direction of the vehicle 10.

In this way, the front seat 12 and the rear seat 13 are provided to face each other in the vehicle body front-to-rear direction. Thereby, the occupant 15 seated on the front seat 12 and the occupant 16 seated on the rear seat 13 can sit to face each other and can relax, for example, in the same way as in the living room of the home. In the following description, the occupants 15, 16 are adults.

<Vehicle Door Apparatus>

(Front Slide Door)

Figure 3:
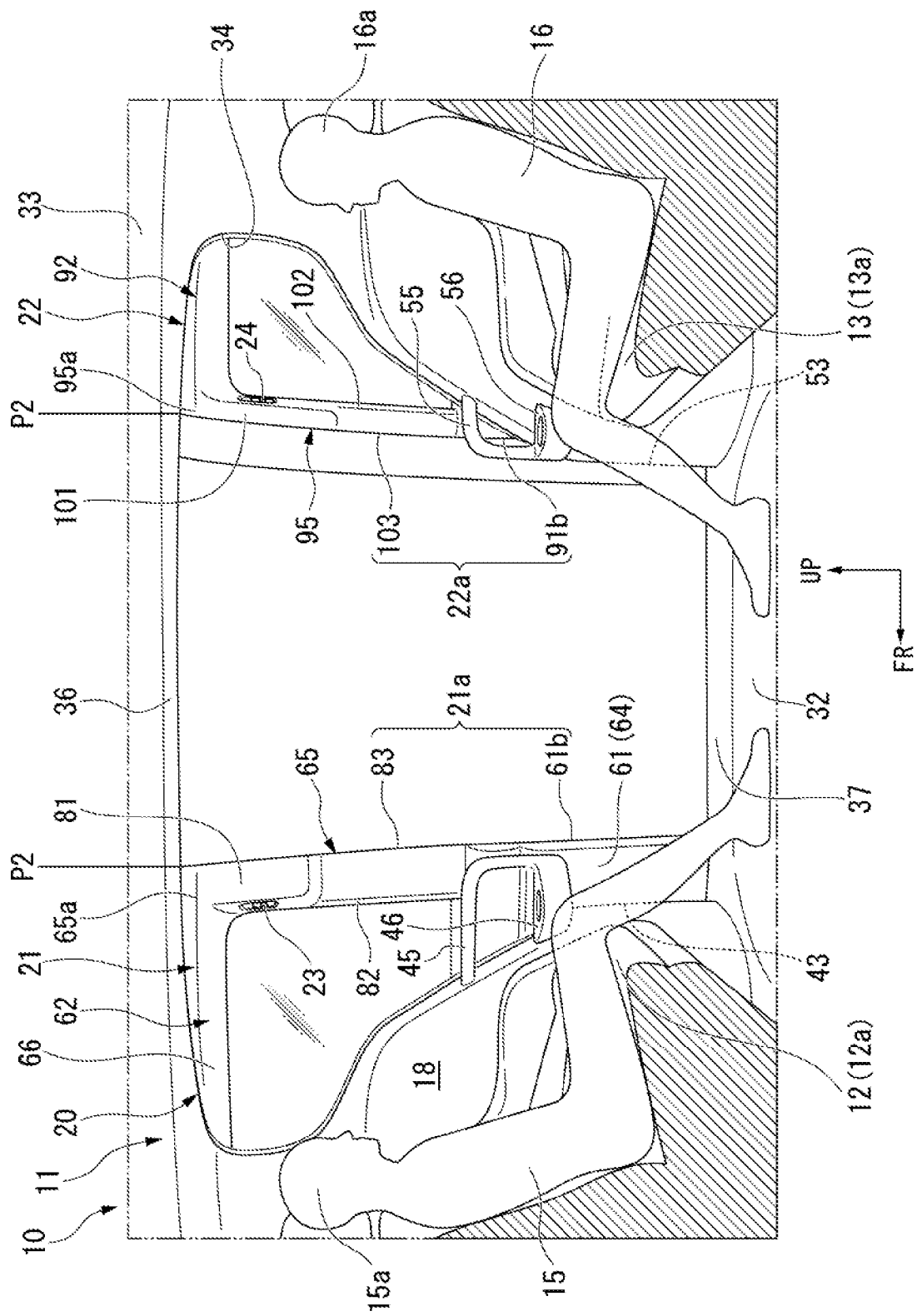
FIG. 3 is a side view showing a state in which the opening part of the vehicle door apparatus is opened when seen from the vehicle room side in the embodiment according to the present invention.

As shown in FIG. 1 to FIG. 3, the front slide door 21 and the rear slide door 22 are provided slidably in the vehicle body front-to-rear direction on the right side portion of the floor part 32 and the right side portion of the roof part 33. That is, the front slide door 21 and the rear slide door 22 are provided slidably in the vehicle body front-to-rear direction between a close position P1 at which the opening part 34 is closed and an open position P2 at which the opening part 34 is opened.

The front slide door 21 includes a front lower half part 61, a front door frame part 62, and a front window glass 63. The front lower half part 61 is covered from a vehicle room 18 side by a front garnish 64 for decoration. The front door frame part 62 is provided on an upper end portion of the front lower half part 61 and supports the front window glass 63. The front door frame part 62 includes a first front frame portion (door frame part) 65, a second front frame portion 66, and a third front frame portion 67.

The first front frame part 65 stands upward to a right end portion of the roof part 33 from a rear end 61a of an upper end portion of the front lower half part 61. The first front frame part 65 has a front top wall (top wall) 81, a first front side wall (inner side wall) 82, a second front side wall 83, and a front outer wall (not shown).

The front top wall 81 is arranged in a direction along an opening/closing direction of the front slide door 21 and protrudes most to the vehicle room 18 side. The first front side wall 82 is arranged substantially in the vehicle width direction from an end edge on the vehicle body frontward direction side of the front top wall 81 toward the outside of the vehicle 10. The first front side wall 82 is positioned at a side to which the front slide door 21 is opened. That is, the first front side wall 82 is arranged toward the front seat 12.

The second front side wall 83 is arranged from an end edge on the vehicle body rearward direction side of the front top wall 81 toward the outside of the vehicle 10. The second front side wall 83, together with a rear wall 61b of the front lower half part 61, forms a front door butt surface 21a that is in contact with the rear slide door 22 in a state where the front slide door 21 is arranged at the close position P1.

An outer end part of the first front side wall 82 and an outer end part of the second front side wall 83 are connected together by a front outer wall. The first front frame part 65 is formed of the front top wall 81, the first front side wall 82, the second front side wall 83, and the front outer wall in a closed cross-section of a rectangular frame.

The second front frame portion 66 extends along a right end portion of the roof part 33 from an upper end portion 65a of the first front frame part 65 toward the vehicle body frontward direction to an upper end 67a of the third front frame portion 67. The third front frame portion 67 is formed along the first front side 41 and the second front side 42 of the front side portion 38 of the opening part 34 in a state where the front slide door 21 is arranged at the close position P1.

(Rear Slide Door)

The rear slide door 22 is formed substantially symmetrical with respect to the front slide door 21 in the vehicle body front-to-rear direction. Similarly to the front slide door 21, the rear slide door 22 includes a rear lower half part 91, a rear door frame part 92, and a rear window glass 93. The rear lower half part 91 is covered from the vehicle room 18 side by a rear garnish 94 for decoration. The rear door frame part 92 is provided on an upper end portion of the rear lower half part 91 and supports the rear window glass 93. The rear door frame part 92 includes a first rear frame portion (door frame part) 95, a second rear frame portion 96, and a third rear frame portion 97.

The first rear frame part 95 stands upward to a right end portion of the roof part 33 from a front end 91a of an upper end portion of the rear lower half part 91. The first rear frame part 95 has a rear top wall (top wall) 101, a first rear side wall (inner side wall) 102, a second rear side wall 103, and a rear outer wall (not shown).

The rear top wall 101 is arranged in a direction along an opening/closing direction of the rear slide door 22 and protrudes most to the vehicle room 18 side. The first rear side wall 102 is arranged substantially in the vehicle width direction from an end edge on the vehicle body rearward direction side of the rear top wall 101 to the outside of the vehicle 10. The first rear side wall 102 is positioned at a side to which the rear slide door 22 is opened. That is, the first rear side wall 102 is arranged toward the rear seat 13.

The second rear side wall 103 is arranged from an end edge on the vehicle body frontward direction side of the rear top wall 101 toward the outside of the vehicle 10. The second rear side wall 103, together with a front wall 91b of the rear lower half part 91, forms a rear door butt surface 22a that is butted to the front door butt surface 21a of the front slide door 21 in a state where the rear slide door 22 is arranged at the close position P1. In other words, the front door butt surface 21a and the rear door butt surface 22a are surfaces butted to each other in a state where the opening part 34 is closed by the front slide door 21 and the rear slide door 22.

An outer end part of the first rear side wall 102 and an outer end part of the second rear side wall 103 are connected together by a rear outer wall. The first rear frame part 95 is formed of the rear top wall 101, the first rear side wall 102, the second rear side wall 103, and the rear outer wall in a closed cross-section of a rectangular frame.

The second rear frame portion 96 extends along a right end portion of the roof part 33 from an upper end portion 95a of the first rear frame part 95 toward the vehicle body rearward direction to an upper end 97a of the third rear frame portion 97. The third rear frame portion 97 is formed along the first rear side 51 and the second rear side 52 of the rear side portion 39 of the opening part 34 in a state where the rear slide door 22 is arranged at the close position P1.

(Front Door Opening/Closing Switch)

The front door opening/closing switch 23 is provided on the front slide door 21. The front door opening/closing switch 23 is a switch that is operated for sliding and moving the front slide door 21 and the rear slide door 22 between the close position P1 at which the opening part 34 is closed and the open position P2 at which the opening part 34 is opened.

For example, by pushing an open operation part of the front door opening/closing switch 23, the slide doors 21, 22 are slid and moved to the open position P2 at which the opening part 34 is opened, and by pushing a close operation part of the front door opening/closing switch 23, the slide doors 21, 22 are slid and moved to the close position P1 at which the opening part 34 is closed.

The front door opening/closing switch 23 is provided on the first front side wall 82 of the first front frame part 65 at a front height position (predetermined height position) H1. The front height position H1 is a height position that corresponds in a vertical direction to a head part 15a of the occupant (that is, an adult) 15 seated on the front seat 12.

The first front side wall 82 is arranged toward the front seat 12. The front door opening/closing switch 23 is provided on the first front side wall 82. Accordingly, the front door opening/closing switch 23 is provided at a position facing the occupant 15 seated on the front seat 12 and at a position where the front door opening/closing switch 23 can be easily confirmed visually by the occupant 15 as shown by an arrow A. That is, the front door opening/closing switch 23 is provided at a position operable from the occupant 15.

Further, the front door opening/closing switch 23 is arranged at an exposed position (non-hidden position) in a state where the front slide door 21 is slid and moved to the open position P2 at which the opening part 34 is opened.

(Rear Door Opening/Closing Switch)

The rear door opening/closing switch 24 is a switch similar to the front door opening/closing switch 23 and is provided on the rear slide door 22. The front door opening/closing switch 23 is a switch that is operated for sliding and moving the front slide door 21 and the rear slide door 22 between the close position P1 at which the opening part 34 is closed and the open position P2 at which the opening part 34 is opened.

For example, by pushing an open operation part of the rear door opening/closing switch 24, the slide doors 21, 22 are slid and moved to the open position P2 at which the opening part 34 is opened, and by pushing a close operation part of the rear door opening/closing switch 24, the slide doors 21, 22 are slid and moved to the close position P1 at which the opening part 34 is closed.

The rear door opening/closing switch 24 is provided on the first rear side wall 102 of the first rear frame part 95 at a rear height position (predetermined height position) H2. The rear height position H2 is at the same height as the front height position H1. The rear height position H2 is a height position that corresponds in the vertical direction to a head part 16a of the occupant 16 (that is, an adult) seated on the rear seat 13.

The first rear side wall 102 is arranged toward the rear seat 13. The rear door opening/closing switch 24 is provided on the first rear side wall 102. Accordingly, the rear door opening/closing switch 24 is provided at a position facing the occupant 16 seated on the rear seat 13 and at a position where the rear door opening/closing switch 24 can be easily confirmed visually by the occupant 16 as shown by an arrow B. That is, the rear door opening/closing switch 24 is provided at a position operable from the occupant 16.

Further, the rear door opening/closing switch 24 is arranged at an exposed position (non-hidden position) in a state where the rear slide door 22 is slid and moved to the open position P2 at which the opening part 34 is opened.

(Front Travel Switch)

A front travel start switch 25 is provided on the front slide door 21. The front travel start switch 25 is a switch operated for allowing the vehicle 10 to travel. By pushing the front travel start switch 25, a drive source such as an engine or a motor for traveling starts, and the vehicle 10 is switched to an automated driving mode.

The front travel start switch 25 is provided in the vicinity of a belt line 61c of the front lower half part 61 of the front slide door 21 at a central portion 61d in the vehicle body front-to-rear direction so as to face the vehicle room 18. The front travel start switch 25 is arranged at a further vehicle body frontward position than the front door opening/closing switch 23 and at a lower position than the front door opening/closing switch 23.

That is, the front travel start switch 25 is arranged closer to the occupant 15 seated on the front seat 12 than the front door opening/closing switch 23 and is arranged at a lower position than the head part 15a of the occupant 15. In other words, the front door opening/closing switch 23 is provided at a position that is more distant from the seat part (seating position) 12a of the front seat 12 than the front travel start switch 25.

Further, the central portion 61d is arranged to be inclined toward the occupant 15 seated on the front seat 12. Accordingly, the front travel start switch 25 is provided at the central portion 61d and is thereby arranged toward the occupant 15 so as to be easily confirmed visually and be easily operated.

Further, the front travel start switch 25 is overlapped to the outside in the vehicle width direction of the vehicle body side part 31 in a state where the slide doors 21, 22 are slid and moved to the open position P2 at which the opening part 34 is opened. Accordingly, the front travel start switch 25 is arranged at a position hidden by the vehicle body side part 31, particularly at a position hidden from the vehicle room 18 side.

Further, the front travel start switch 25 is arranged at a position hidden prior to the front door opening/closing switch 23 when the front slide door 21 is slid and moved in a direction in which the opening part 34 is opened.

(Rear Travel Switch)

A rear travel start switch 26 is provided on the rear slide door 22. The rear travel start switch 26 is a switch operated for allowing the vehicle 10 to travel similarly to the front travel start switch 25. By pushing the rear travel start switch 26, a drive source such as an engine or a motor for traveling starts, and the vehicle 10 is switched to an automated driving mode.

The rear travel start switch 26 is provided in the vicinity of a belt line 91c of the rear lower half part 91 of the rear slide door 22 at a central portion 91d in the vehicle body front-to-rear direction so as to face the vehicle room 18. The rear travel start switch 26 is arranged at a further vehicle body frontward position than the rear door opening/closing switch 24 and at a lower position than the rear door opening/closing switch 24.

That is, the rear travel start switch 26 is arranged closer to the occupant 16 seated on the rear seat 13 than the rear door opening/closing switch 24 and is arranged at a lower position than the head part 16a of the occupant 16. In other words, the rear door opening/closing switch 24 is provided at a position that is more distant from the seat part (seating position) 13a of the rear seat 13 than the rear travel start switch 26.

Further, the central portion 91d is arranged to be inclined toward the occupant 16 seated on the rear seat 13. Accordingly, the rear travel start switch 26 is provided at the central portion 91d and is thereby arranged toward the occupant 16 so as to be easily confirmed visually and be easily operated.

Further, the rear travel start switch 26 is overlapped to the outside in the vehicle width direction of the vehicle body side part 31 in a state where the slide doors 21, 22 are slid and moved to the open position P2 at which the opening part 34 is opened. Accordingly, the rear travel start switch 26 is arranged at a position hidden by the vehicle body side part 31, particularly at a position hidden from the vehicle room 18 side.

Further, the rear travel start switch 26 is arranged at a position hidden prior to the front door opening/closing switch 23 when the front slide door 21 is slid and moved in a direction in which the opening part 34 is opened.

As described above, according to the vehicle door apparatus 20 of the present embodiment, the following advantages can be obtained. The front door opening/closing switch 23 and the rear door opening/closing switch 24 are arranged symmetrically in the front-to-rear direction. Further, the front travel start switch 25 and the rear travel start switch 26 are arranged symmetrically in the front-to-rear direction. Accordingly, the front door opening/closing switch 23 and the front travel start switch 25 are described in detail below, and detailed description of the rear door opening/closing switch 24 and the rear travel start switch 26 is omitted.

That is, according to the vehicle door apparatus 20, the front door opening/closing switch 23 is provided on the first front side wall 82 of the front slide door 21. Accordingly, the front door opening/closing switch 23 is arranged facing the front seat 12. Thereby, it becomes possible for the occupant 15 seated on the front seat 12 to easily operate the front door opening/closing switch 23.

Further, by providing the front door opening/closing switch 23 on the first front side wall 82, it is possible to prevent the front door opening/closing switch 23 from protruding to the vehicle room 18 side from the front top wall 81 of the first front frame part 65. The front top wall 81 is a wall part that protrudes most to the vehicle room 18 side of the first front frame part 65. Accordingly, by allowing the front door opening/closing switch not to protrude from the front top wall 81 to the vehicle room 18 side, for example, it is possible to allow the body or hand of the occupant 15 seated on the front seat 12 not to easily touch the door frame part inadvertently. Thereby, it is possible to prevent an erroneous operation of the front door opening/closing switch 23 by a simple configuration in which the front door opening/closing switch 23 is provided on the first front side wall 82.

Further, the front seat 12 and the rear seat 13 are provided to face each other at the position on the front slide door 21 side and at the position on the rear slide door 22 side, and thereby, the front seat 12 is arranged to face the first front side wall 82. Accordingly, it is possible to allow the front door opening/closing switch 23 of the first front side wall 82 to face the occupant 15 seated on the front seat 12. Further, the front door opening/closing switch 23 is arranged at a position operable from the occupant 15 seated on the front seat 12. Thereby, it is possible to allow the occupant 15 seated on the front seat 12 to easily operate the front door opening/closing switch 23.

Further, by providing the front door opening/closing switch 23 at the front height position H1 corresponding to the head part 15a of the occupant (that is an adult) 15 seated on the front seat 12, the front door opening/closing switch 23 can be arranged at a high position to some extent. Thereby, it is possible to allow the body or hand of the occupant (adult) 15 seated on the front seat 12 not to easily touch the front door opening/closing switch 23 inadvertently, and it is possible to further favorably prevent an erroneous operation of the front door opening/closing switch 23.

Further, by arranging the front door opening/closing switch 23 at a high position to some extent, for example, it is possible to prevent an inadvertent operation by a child or the like.

Additionally, in a state where the front slide door 21 is opened to the open position P2, the front travel start switch 25 is arranged at a hidden position. Thereby, in a state where the front first slide door 21 is open, for example, it is possible to allow the body or hand of the occupant 15 seated on the front seat 12 not to touch the front travel start switch 25, and it is possible to prevent an erroneous operation of the front travel start switch 25.

Further, in a state where the front slide door 21 is opened to the open position P2, the front door opening/closing switch 23 is arranged at an exposed position (non-hidden position). Thereby, in a state where the front slide door is opened to the open position P2, the front door opening/closing switch 23 is operable, and it is possible to close the front slide door 21 and the rear slide door 22.

Further, the front travel start switch 25 is arranged at a position hidden prior to the front door opening/closing switch 23 when the front slide door 21 is slid and moved in a direction in which the opening part 34 is opened. Accordingly, it is possible to hide the front travel start switch 25 when the front slide door 21 is open. Thereby, when the front slide door 21 is slid and moved to the open direction, it is possible to prevent the front travel start switch 25 from being operated, and it is possible to prevent the vehicle from traveling.

Additionally, the front door opening/closing switch 23 is arranged at a position that is more distant from the seat part 12a of the front seat 12 than the front travel start switch 25. Thereby, it is possible to allow the body or hand of the occupant 15 seated on the front seat 12 not to easily touch the front door opening/closing switch 23 inadvertently, and it is possible to further favorably prevent an erroneous operation of the front door opening/closing switch 23.

Further, by arranging the front door opening/closing switch 23 at a position that is more distant from the seat part 12a of the front seat 12 than the front travel start switch 25, it is possible to arrange the front travel start switch 25 at a position closer to a side to which the front slide door 21 is opened compared to the front door opening/closing switch 23. Accordingly, it is possible to hide the front travel start switch 25 when the front slide door 21 is slid and moved to the open direction. Thereby, when the front slide door 21 is slid and moved to the open direction, it is possible to prevent the front travel start switch 25 from being operated and prevent the vehicle 10 from traveling.

Further, similarly to the front door opening/closing switch 23 and the front travel start switch 25, the rear door opening/closing switch 24 and the rear travel start switch 26 can allow the switches 24, 26 to be easily operated. Further, the rear door opening/closing switch 24 and the rear travel start switch 26 can prevent an erroneous operation of the switches 24, 26 by a simple configuration.

The technical scope of the present invention is not limited to the embodiment described above, various modifications can be made without departing from the scope of the present invention.

For example, the embodiment is described using an example in which the first slide door and the second slide door are the front slide door 21 and the rear slide door 22 that are opened and closed in the vehicle body front-to-rear direction; however, the embodiment is not limited thereto. As another example, the first slide door and the second slide door may be, for example, doors that are opened and closed in the vehicle width direction.

A component in the embodiment can be replaced with a known component without departing from the scope of the present invention, and modified examples described above may be suitably combined.

The invention claimed is:

1. A vehicle door apparatus, comprising:
   a first slide door and a second slide door that are slidably provided between a close position at which an opening part of a vehicle is closed and an open position at which the opening part is opened and that have door frame parts butted to each other in a state where the opening part is closed; and
   a door opening/closing switch that is provided on an inner side wall positioned on a side to which each slide door is opened among the door frame parts of the first slide door and the second slide door and that opens and closes each of the slide doors.

2. The vehicle door apparatus according to claim 1, comprising
   a first seat and a second seat provided to face each other at a position on the first slide door side and at a position on the second slide door side, respectively,
   wherein the door opening/closing switch is provided at a position facing an occupant seated on each of the first seat and the second seat and operable from the occupant.

3. The vehicle door apparatus according to claim 2,
   wherein the door opening/closing switch is provided at a position that corresponds to a head part of the occupant.

4. The vehicle door apparatus according to claim 1, comprising
   a travel start switch that is provided on the first slide door and the second slide door and that operates a travel of the vehicle,
   wherein the travel start switch is arranged at a hidden position in a state where each of the slide doors is opened to the open position.

5. The vehicle door apparatus according to claim 1,
   wherein the door opening/closing switch is arranged at an exposed position in a state where each of the slide doors is opened to the open position.

6. The vehicle door apparatus according to claim 1, comprising
   a travel start switch that is provided on the first slide door and the second slide door and that operates a travel of the vehicle,
   wherein the travel start switch is arranged at a position where the travel start switch is hidden prior to the door opening/closing switch when each of the slide doors is slid and moved in a direction in which the opening part is opened.

7. The vehicle door apparatus according to claim 1, comprising:
   a first seat and a second seat provided to face each other at a position on the first slide door side and at a position on the second slide door side, respectively; and
   a travel start switch that is provided on each of the first slide door and the second slide door and that operates a travel of the vehicle,
   wherein the door opening/closing switch is provided at a position that is more distant from a seating position of each of the seats than the travel start switch.

* * * * *